(12) United States Patent  (10) Patent No.: US 7,753,179 B2
Robertson  (45) Date of Patent: Jul. 13, 2010

(54) SUSPENSION SYSTEM

(75) Inventor: Graeme Kershaw Robertson, Shepparton East (AU)

(73) Assignee: Robertson Suspension Systems Pty Ltd. (AU)

( * ) Notice: Subject to any disclaimer, the term of this patent is extended or adjusted under 35 U.S.C. 154(b) by 0 days.

(21) Appl. No.: 12/355,311

(22) Filed: Jan. 16, 2009

(65) Prior Publication Data

US 2009/0260937 A1  Oct. 22, 2009

Related U.S. Application Data

(63) Continuation of application No. 11/305,658, filed on Dec. 16, 2005, now abandoned, which is a continuation-in-part of application No. 10/400,950, filed on Mar. 27, 2003, now abandoned, which is a continuation-in-part of application No. PCT/AU01/01210, filed on Sep. 27, 2001.

(51) Int. Cl.
*F16D 57/00* (2006.01)
*F16F 9/22* (2006.01)

(52) U.S. Cl. .................. 188/266; 267/64.25; 267/64.15

(58) Field of Classification Search ........... 188/118 XL, 188/266; 267/64.26, 64.15
See application file for complete search history.

(56) References Cited

U.S. PATENT DOCUMENTS

| | | | |
|---|---|---|---|
| 2,570,362 | A | 10/1951 | Mercier |
| 2,724,590 | A | 11/1955 | Irwin |
| 3,083,000 | A | 3/1963 | Perdue |
| 3,647,239 | A | 3/1972 | Katsumori |

(Continued)

FOREIGN PATENT DOCUMENTS

AU   2003 203440 A1   4/2003

(Continued)

*Primary Examiner*—Bradley T King
*Assistant Examiner*—Mahbubur Rashid
(74) *Attorney, Agent, or Firm*—Smith, Gambrell & Russell

(57) ABSTRACT

A suspension unit (110) for a suspension system has an accumulator (112) for holding and maintaining a fluid such as a gas under pressure. The accumulator is associated with a motion damping unit (114) that is filled with a fluid, such as an oil, in operation. The accumulator includes a floating piston (122) that separates a first chamber (120) in which is stored the pressurized gas, and a second chamber (124) for storing the other fluid under pressure. A third chamber (128) in the motion damping unit (114) is in fluid flow communication with the second chamber (124) of said accumulator through valve means (126) controlling the flow of fluid between the chambers. Relative movement between the accumulator (112) and said motion damping unit (114) causes fluid to flow from the second chamber (124) of the accumulator (112) through the valve (126) to the third chamber (128) whereby gas pressure in said first chamber (120) moves the floating piston (122) in the accumulator thereby reducing the gas pressure in said first chamber.

A side chamber (152) within said motion damping unit (114) also expands and contracts with said relative retracting and extending movement of said accumulator (112) and the motion damping unit (114). At least one bleed port (156) communicates the side chamber (152) with the second chamber (124), the bleed port (156) restricting the flow of fluid between the side chamber (152) and the second chamber (124) thereby assisting control of the relative movement of the accumulator (112) and the motion damping unit (114).

15 Claims, 13 Drawing Sheets

U.S. PATENT DOCUMENTS

| | | |
|---|---|---|
| 3,788,433 A | 1/1974 | Katsumori |
| 3,820,772 A | 6/1974 | Kerr et al. |
| 4,078,638 A | 3/1978 | Koyama et al. |
| 4,381,857 A | 5/1983 | Cook |
| 4,428,587 A | 1/1984 | Forch |
| 4,749,068 A | 6/1988 | Sirven |
| 5,174,598 A | 12/1992 | Sato et al. |
| 5,384,706 A | 1/1995 | Uchiyama et al. |

FOREIGN PATENT DOCUMENTS

| | | |
|---|---|---|
| DE | 35 43 156 A1 | 6/1987 |
| DE | 38 13 021 A1 | 11/1989 |
| EP | 0 882 901 A1 | 12/1998 |
| GB | 2 296 092 A | 4/1988 |
| JP | 10 86627 | 4/1998 |
| SU | 645861 | 2/1979 |

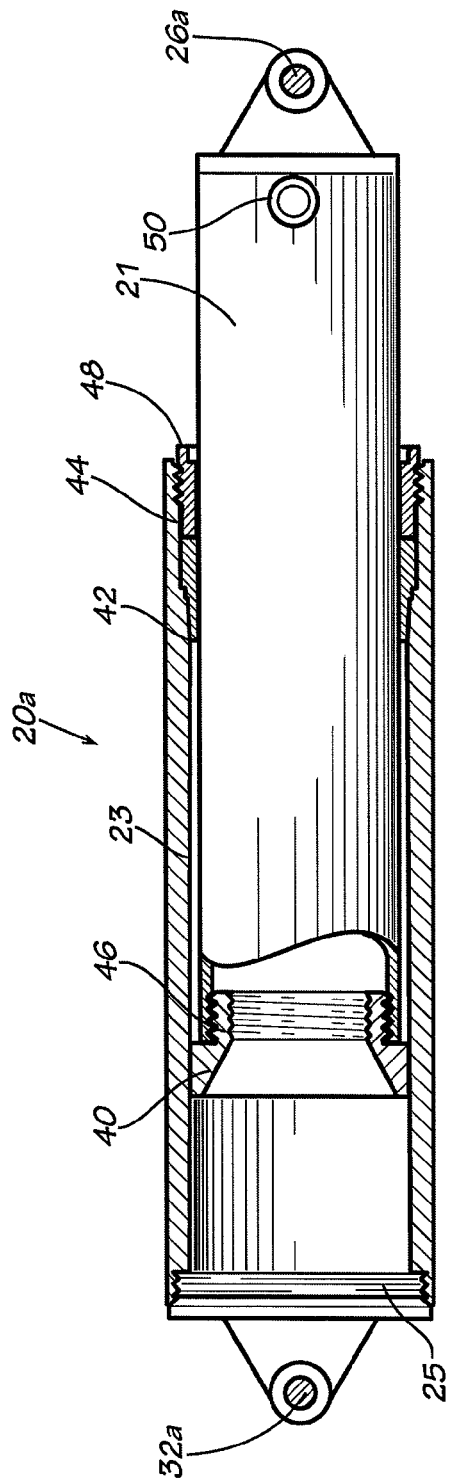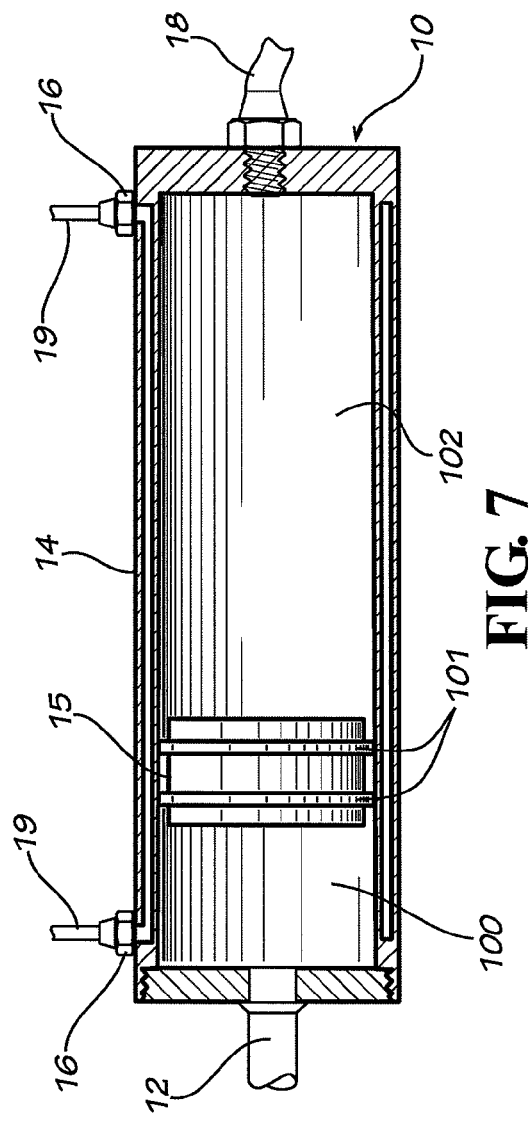

SUSPENSION SYSTEM

CROSS-REFERENCE TO RELATED APPLICATIONS

This is a continuation of prior continuation-in-part patent application Ser. No. 11/305,658 filed Dec. 16, 2005 now abandoned; which is a continuation-in-part of prior patent application Ser. No. 10/400,950 filed Mar. 27, 2003 now abandoned; which is a continuation-in-part of PCT AU01/01210 filed Sep. 27, 2001 and claims the benefit of priority therewith.

TECHNICAL FIELD

The present invention relates generally to suspension units and/or. suspension systems, particularly adapted for but not exclusively for use with, vehicles or the like, including suspension units and/or suspension systems for vehicles which travel along sealed roads and suspension systems for vehicles which travel off-road such as for example, off-road racing vehicles including motorcycles, military vehicles, vehicles used in the mining industries particularly to transport ore materials and the like. The suspension system is also adapted for use in industrial applications, such as for example, industrial switch gear applications, suspension systems for seats, particularly vehicle seats, truck cab suspensions or the like.

More particularly, the present invention relates to vehicle suspension units of the combined gas and liquid type suspension systems, such as those having a moveable piston, which systems may not have any metal springs, such as leaf springs, coil springs or the like as part of the suspension system.

Even more particularly, the present invention relates to an oleo-pneumatic suspension system having a reservoir or accumulator for storing or holding fluid, such as hydraulic oil, silicone oil or similar, under gas pressure, in fluid communication with a motion damping device having a valve arrangement or similar so that the fluid is continually being transferred between the accumulator and the motion damping device in response to movement of the road wheel of the vehicle with which the system is associated in use of the vehicle. When used in place of metal springs, the suspension uses gas under pressure to provide the system with resilience and to effect controlled rebound of the suspension components and the control movement of the road wheel and/or to adjust the height of the suspension, particularly the ride height of the vehicle. The present invention also finds application in a compact suspension system having a single unit which is a combined suspension system for adjusting the ride height of the vehicle and a motion damping system for use in a wide variety of vehicles extending from motorcycles through to more or less conventional vehicles for normal road use, and four wheel drive vehicles to specialist vehicles such as military vehicles and industrial vehicles.

Although the present invention will be described with particular reference to different forms of the suspension system it is to be noted that the present invention is not limited in scope to the described embodiments but rather the scope of the present invention is more extensive so as to include other components and arrangements of the suspension system and other uses than the specific embodiments described, including applications other than adjusting the spatial arrangement of two moveable members and controlling their movement relative to each other.

BACKGROUND OF THE INVENTION

One problem associated with vehicles crossing rough terrain is the amount of travel required of the suspension system. Unless virtually unlimited travel of the suspension system is provided which is impracticable, when the suspension system reaches its limit of travel there will be contact of one component against another component which produces a jolting ride and ultimately fatigue of the components contacting each other as well as loss of traction and less control of the vehicle. In conventional suspension systems having metal springs, even variable rate metal springs, such as coil springs or auxiliary springs, owing to the compression/rebound characteristics of the metal springs, the suspension often reaches its limit of travel so that components of the suspension system contact the body of the vehicle, such as for example, the suspension arms contacting the bump stop provided on the vehicle or the vehicle "bottoms out". When this occurs, not only are the occupants of the vehicle jolted or the freight being carried by the vehicle subject to shock, but also the contact of the various individual suspension components against each other from time to time breaks one or more of the suspension components or the body or chassis of the vehicle. Broken suspension components can occur in diverse areas of activities such as in off-road racing where vehicles must travel fast over rough terrain, in the mining industry where extremely heavy loads must be transported over rough terrain in harsh and corrosive environments, and in military applications where men and equipment must be transported in arduous conditions, even including parachuting vehicles, such as four wheel drives, jeeps and the like from low flying aeroplanes onto the ground where the vehicles land with a jolt, often disabling the vehicle and equipment loaded with the vehicle due to the limited compliance of the suspension systems of such vehicles.

In many applications it is desirable to have a more supple suspension even though the vehicle is used in a harsh environment. In these applications not only must the suspension components be durable and reliable but the ride must also be substantially smooth or at least the suspension must not reach the limits of its travel or "bottom out". Therefore, it is one aim of the present invention to provide a suspension system which can be used in harsh environments such as rough terrain and which provides a supple ride, particularly without the use of metal springs or other components.

Another problem of existing conventional suspension systems having metal springs or similar components relates to the ride height of the vehicle and the adjustability of the ride height. In many instances, the ride vehicle which is not adjustable is set by the various components of the suspension, such as the coil spring or the like. In order to change the ride height it is necessary to physically interchange components which is expensive, time consuming and wasteful of materials and components. Often the ride height of a vehicle, such as an off road racing vehicle, will need to be adjusted quickly one or more times during the same event. Conventional suspensions do not usually allow such adjustments to be made quickly. Therefore, there is a need for a suspension system that allows the ride height of a vehicle to be adjusted, particularly adjusted quickly and effectively.

In other applications, such as for example, in normal domestic vehicles of the type which are privately owned or in motor cycles, there is a need for suspensions which occupy a smaller space within the confines of the car, bike or similar and yet work at least as effectively as more conventional suspensions in ordinary everyday driving. Thus, there is a need for a more compact suspension system which occupies less room on or within a vehicle and also provides acceptable ride and comfort, which suspension system can be adapted for use in normal road going cars.

SUMMARY OF THE INVENTION

According to one aspect of the present invention there is provided A suspension unit including:

an accumulator for holding and maintaining a fluid under pressure, and a motion damping means, said accumulator having a floating piston that sealingly separates a first chamber for storing a pressurized gas and a second chamber for storing said fluid under pressure;

said motion damping means including a third chamber, that is fluid-filled in operation, in fluid flow communication with said second chamber of said accumulator, said motion damping means having valve means separating said second chamber from said third chamber for permitting a controlled flow of said fluid between said second and third chambers;

wherein said accumulator and said motion damping means are capable of relative retracting and extending movement during which fluid is forced through said valve means at respective predetermined controlled rates so as to dampen the relative retracting and extending movement;

said relative movement being such that when said accumulator and said motion damping means relatively extend, fluid is caused to flow from said second chamber of the accumulator through the valve means to said third chamber of said motion damping means, whereby gas pressure in said first chamber moves said floating piston in said accumulator thereby reducing the gas pressure in said first chamber, and when said accumulator and said motion damping means relatively retract, fluid is caused to flow from said third chamber of said motion damping means through the valve means to said second chamber of said accumulator, thereby increasing the fluid pressure therein and moving said floating piston to increase the pressure of the gas in said first chamber;

wherein said suspension system further includes:

a side chamber within said motion damping means about said accumulator, wherein said side chamber respectively expands and contracts with said relative retracting and extending movement of said accumulator and said motion damping means; and at least one bleed port communicating said side chamber with said second chamber, the bleed port restricting the flow of fluid between the side chamber and the second chamber thereby assisting control of the relative movement of the accumulator and said motion damping means.

Typically, the suspension unit is a compact unit, preferably adapted for use with vehicles, including motorcycles, particularly off-road or all terrain vehicles and motorcycles, racing motorcycles and with conventional road going vehicles or the like.

Preferably, the suspension unit or a suspension system incorporating the unit is self leveling or self adjusting with respect to ride height. More preferably, the suspension is adjustable to alter the ride height.

Preferably, the first chamber of the accumulator or reservoir is a gas filled chamber in which gas is stored under pressure. In one form, the gas is air, nitrogen, oxygen, inert gas or the like including combinations and mixtures thereof. Preferably, the first chamber of the accumulator is provided with a gas valve allowing gas to be admitted to or withdrawn from the accumulator. With this arrangement, the accumulator can be pressurized to any suitable pressure as predetermined by a particular application. The pressure may vary from a very low pressure such as less than 20 psi to a very high pressure. Typically, the predetermined pressure can range from less than 20 psi to being in excess of 2000 psi. However, subject to load, lower pressures can be used in applications such as push bikes, motorcycles and other light weight vehicles whereas pressures of about 200 psi can be used for heavy duty vehicles and higher pressures for specialized vehicles. More typically, the gas pressure in the accumulator is adjustable to any value in accordance with requirements of the vehicle to which the suspension system of the present invention is. fitted depending upon the size of the vehicle, the type of vehicle, the intended use of the vehicle, the ride height of the vehicle, and the speed of which the vehicle is driven and other similar variables. Typically, the ride height can be adjusted by adjusting the gas pressure.

The piston is located at the interface of the first chamber and second chamber and separates the gas in the first chamber from the fluid in the second chamber. In use, the sizes of the first and second chambers changes in accordance with the position of the piston and movement of the piston. Typically, the piston is a floating piston or a freely moving piston, particularly freely moving with respect to the side walls of the accumulator.

Typically, the accumulator is a hollow cylinder prior to filling with gas and/or fluid and the piston is double sided and moves axially within the bore of the cylinder in response to changing pressure conditions within the accumulator. The combined volume of the first and second chambers of the accumulator remain constant irrespective of the position or movement of the piston.

However, the volume of the third chamber in the motion damping means changes during operation of the suspension system with changes to the position of the damping means with respect to the accumulator.

The motion damping means may be used to control the ride height of the vehicle. In one form, the suspension unit or system is provided with one or more additional external shock absorbers to assist load-carrying capacity. Otherwise, embodiments of the unit of the invention function as a shock absorber or performs the same as or a similar function to a shock absorber, but without having the piston and shaft arrangement of a conventional shock absorber. More typically the damping means is a variable rate ride height component in which the flow of fluid in one direction is controlled at a first rate and the flow of fluid in a second direction is controlled at a second rate. The first rate can be the same as or different to the second rate, one rate is associated with compression of the damping means whereas the other rate is associated with extension of the damping means.

Typically, the combined volume of motion damping device and first chamber is from about 500 ml to about 3.5 litres. However, the capacity of each individual component and of the system overall can take any value depending upon application, size, type and arrangement.

Typically, the size of the valves of the motion damping device are selected in accordance with the size of the accumulator and the motion damping device to allow controlled free flow of fluid between the accumulator and the motion damping device.

Typically, the damping unit is provided with bypass passages, conduits, tubes, tubing, or similar interconnecting the sides of the unit to provide variable valving for different rates of movement of the piston in the damping device depending upon the position of the piston. Typically, the by-pass passages are located externally of the damping unit. More typically, adjustment of the variable rates is from outside the damping unit by adjusting the flow of fluid through the by-pass passages.

Typically, the components making up the suspension unit or suspension system are low friction, such as by being coated with a teflon coating or similar.

Typically, the suspension unit or suspension system is an active suspension system, preferably a computer controlled suspension system. More typically, the suspension unit or suspension system includes an auxiliary reservoir, canister, container or the like in fluid communication with the main suspension unit. The canister contains gas held under a predetermined pressure by a piston. The canister is also in fluid communication with a further container of oil under pressure having a piston so that the oil acts on the gas piston to pressurize or maintain the gas under pressure. Sensors control operation of the piston in the oil canister to maintain pressure in the gas canister. Even more typically, the arrangement is a back-up or fail safe arrangement for the main suspension unit.

In one or more embodiments, the suspension system includes a further chamber and associated ports whereby the further chamber receives the fluid from, the chamber of the second part during extending movement, but on rebounding therefrom such fluid is bled into the chamber of the first part.

The suspension system may include a gas-chargeable chamber of selectively variable pressure, for use in adjusting the at rest separation of the first and second parts.

The present invention will now be described by way of example with reference to the accompanying drawings in which:

DESCRIPTION OF THE DRAWINGS

FIG. 6 is a cross-sectional view of one form of the fluid filled damping unit or suspension unit of the present invention;

FIG. 7 is a cross-sectional view of one form of the accumulator used in the suspension system of the present invention;

DESCRIPTION OF PREFERRED EMBODIMENTS

Figure 1:
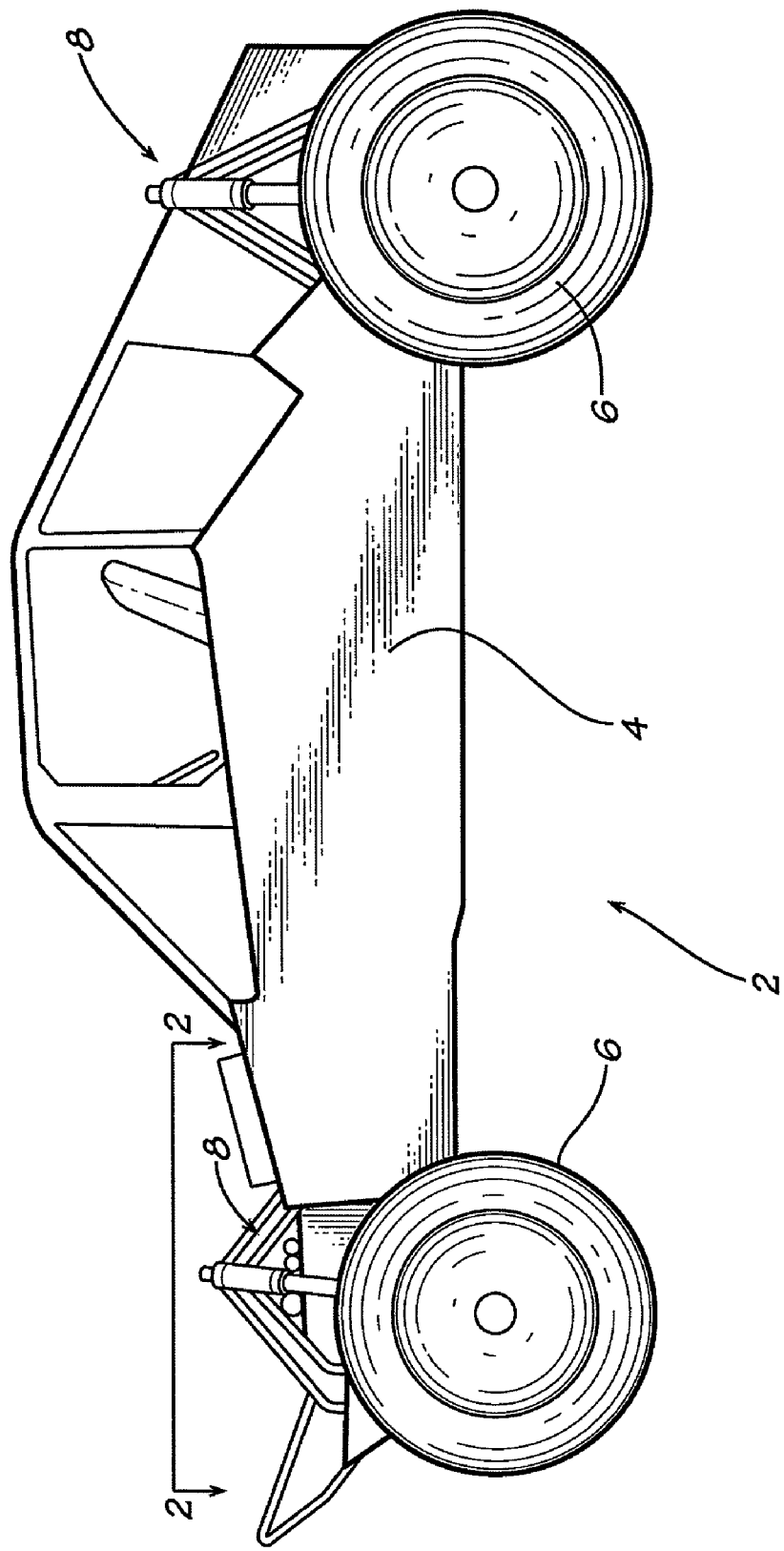
FIG. 1 is a side schematic view of one form of a vehicle having the suspension system including the suspension units of the present invention located at the front and rear of the vehicle.
Figure 2:
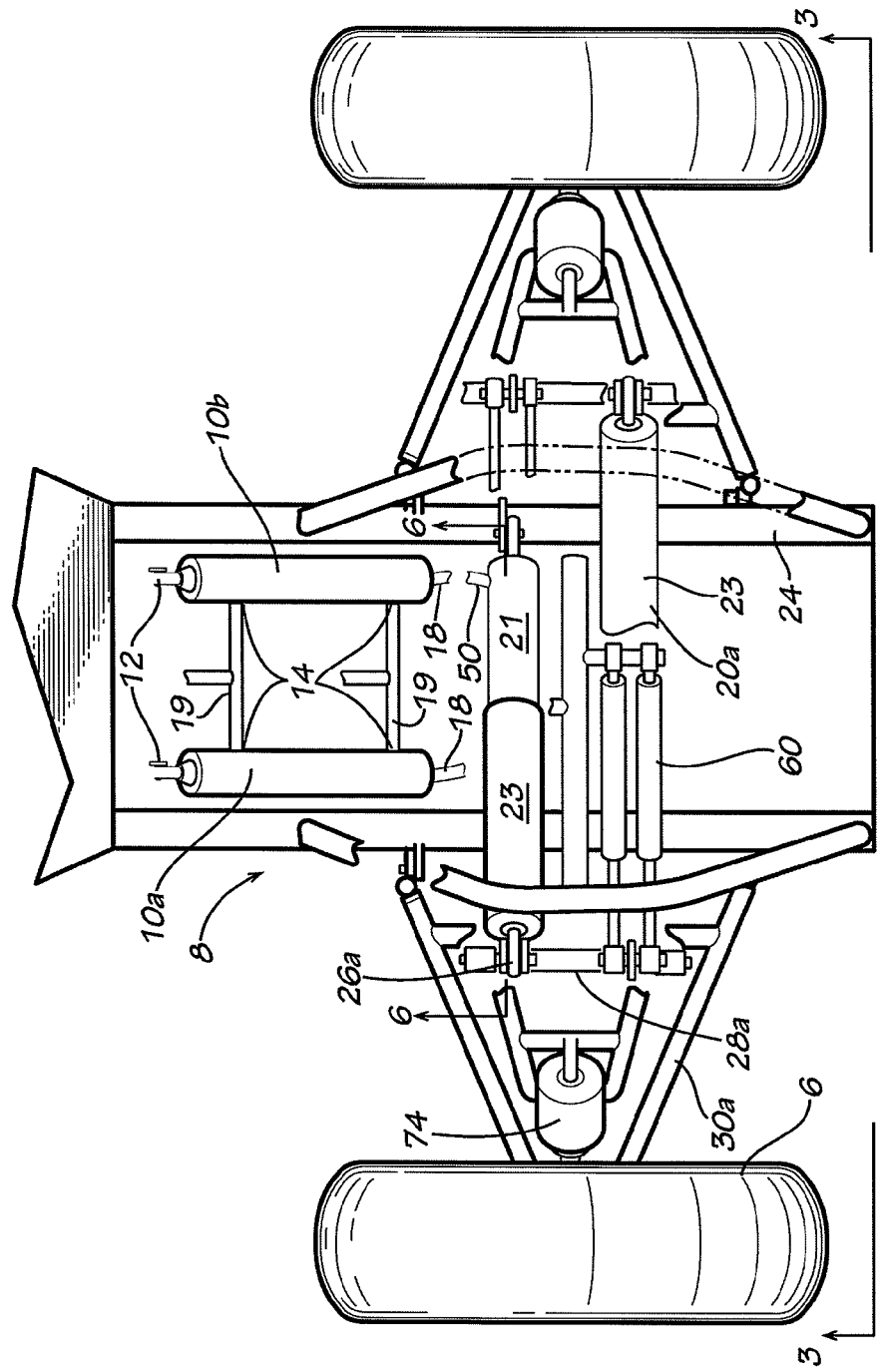
FIG. 2 is a top plan view taken along the line 2 to 2 of FIG. 1.

In FIG. 1 there is shown one form of a motor vehicle having the suspension system incorporating one form of the suspension unit of the present invention. This form of the motor vehicle is an off-road vehicle, typically an off-road racing vehicle generally denoted as 2. Vehicle 2 is provided with a body 4, a set of road wheels 6 and a suspension system 8 located at or towards the front of the vehicle and another suspension system 8 located at the rear of the vehicle. It is to be noted that the suspension system 8 at the front of the vehicle can be the same, substantially the same or different to the suspension system 8 located at the rear of the vehicle. For the sake of clarity and ease of description the suspension at the front of the vehicle will be described in detail. The rear suspension is in essence the same, although detailed changes can be effected depending upon circumstances.

In FIGS. 2 to 5, there are shown different views of the suspension system 8 in different operating positions. Starting with FIG. 2 there is shown a general view of the layout of the suspension components forming the suspension system when the vehicle is in the normal at rest position. This form of the suspension system includes the suspension unit separated into two different components in fluid communication with each other. Suspension system 8 includes two accumulators 10a, 10b located in substantially parallel side by side relationship to each other and provided with gas valves 12 at their respective tops for admitting gas, typically air, nitrogen, oxygen or the like including combinations of different gases under pressure to the accumulators 10a, 10b, so as to pressure the accumulators and to maintain any fluid in the accumulators under pressure. The accumulators are part of one form of the suspension units of the present invention.

With particular reference to FIG. 7, one form of a single accumulator 10 will be described. Accumulator 10 in one form is cylindrical and is provided with a cylindrical water jacket 14 surrounding the internal cylindrical wall 15 of the accumulator. Two inlets/outlets 16 are provided to allow coolant, such as water or a water ethylene glycol mixture to circulate around within the jacket 14 of each accumulator 10. A radiator (not shown) is provided to cool the coolant in operation of the vehicle. Conduits 19 convey coolant to and from the radiator. It is to be noted that each accumulator 10 can have its own radiator or there may be a single radiator for cooling both accumulators 10a and 10b. In other embodiments the accumulator does not have a cooling jacket but is either provided with cooling fins or cooling is through the walls of the accumulator.

A double faced piston (17) is provided within the bore formed by the cylindrical inner wall 15 of the accumulator to divide the accumulator into two cavities, 100 and 102. Gas under pressure is stored in cavity 100 whereas fluid is stored in cavity 102 under pressure exerted by the gas pressure in cavity 100 via piston 17 in use of the suspension system. Two sealing rings 101 are provided in the side wall of piston 17 to assist in separating the gas in cavity 100 from the fluid in cavity 102. As piston 17 moves axially towards valve 12 there is an increase in gas pressure of the gas located in cavity 100 and when piston 17 moves axially towards conduit 18 fluid is forced out of accumulator 10 thus reducing the gas pressure in cavity 100. It is to be noted that accumulator 10a is provided for the suspension system on the right hand side of vehicle 2 whilst accumulator 10b is provided for the left hand front suspension only. Further, it is to be noted that the fluid connection and communication for the left hand side suspension is isolated from that of the right hand side so that there is no transfer of fluid between the two separate and isolated systems corresponding to either side of the vehicle.

The suspension system on the right hand side of vehicle 2 will now be described, that on the left hand side being substantially identical. A flexible conduit 18 extends between one end of accumulator which is the end opposite gas valve 12 to one end of damping unit 20a to allow fluid under pressure to flow between the accumulator 10a and damping unit 20a depending upon the position of road wheel 6 with respect to vehicle 2. The damping unit 20a is the other part of the suspension unit separated from but in fluid communication with the accumulator.

Whilst the damping unit 20a is similar in construction and operation to a shock absorber, it is also very different to a conventional shock absorber since the damping unit does not have the moveable valve and shaft arrangement of the conventional shock absorber and the conventional shock absorber cannot be used to maintain the ride height of the vehicle.

Damping unit 20a includes two telescopic members with an inner tube 21 located within the outer tube 23. A flow regulator in the form of a valve is located intermediate the two telescopic members 21, 23 and regulates the flow of fluid through the damping unit in accordance with movement of road wheel 6 in use of vehicle 2. The distal end of the inner member 21 of damping unit 20a, is fixedly connected to chassis member 24 by a pivoting fitting 26a. The distal end of the outer member 23 of damping unit 20a is pivotally connected to a strut arrangement 28a fixedly connected to upper wishbone 30a by pivoting fitting 32a. One end of upper wishbone 30a is pivotally connected to chassis member 24 by pivoting fitting 27a while the other end is connected to the hub 34 of road wheel 6. As road wheel 6 moves vertically upwards and downwards in operation of vehicle 2 the end of wishbone 30a connected to hub 34 moves vertically upwards and downwards accordingly. In turn, the outer tube 23 of damping unit 20a connected to strut arrangement 28a moves axially along the lengthwise direction of the shock absorber to extend or retract the damping unit. It is to be noted that damping unit 20a may be provided with external shock absorbers 60 either in addition to or as a replacement for damping unit 20a and/or the fluid control valve located internally within damping unit 20a.

The construction of the damping unit 20a will now be described in more detail with particular reference to FIG. 6. Outer telescopic tube 23 is formed as a tube having the distal end closed and the proximal end open or if both ends are open the distal end is sealed by a sealing cap 25. In one embodiment the inner wall of outer tube 23 is threaded to receive the correspondingly threaded cap 25 and 'O'-ring of resilient material such as rubber (not shown). The proximal end of outer tube 23 is open to receive the proximal end of the inner tube 21. The distal end of inner tube 21 is provided with a bush 40, typically made from brass within this tube is located a valve for controlling the rate of fluid flow through damping unit 20a, such as for example, a flooder valve having a plurality of apertures (not shown) for controlling the rate of flow of fluid in both directions from one end of the damping unit to the other end of the unit. In one embodiment of the flooder valve there are two sets of apertures; one set controlling the flow of fluid as the damping unit extends to increase its volume and another set for controlling the flow of fluid as the unit retracts to decrease its volume. The two sets of apertures in one embodiment can be of the same size so that the rate of extension of the damping unit is about the same as the rate of retraction or in other embodiments the two sets of apertures may be of different sizes so that the rate of extension is different to the rate of retraction. The rates of flow in either direction are adjustable, such as for example, by the use of shims to partially open and close the apertures of the valve.

In a preferred embodiment the rate of extension of the damping unit is greater than the rate of retraction to allow the road wheels to more quickly follow the contour of the road through a dip and to compress more slowly so as to retard the speed with which the suspension rebounds to its at rest position. The respective proximal ends of the inner tube 21 and outer tube 23 are sealingly connected to each other by a suitable sealing means. In one embodiment the sealing means includes an inner bearing 42 and a plastic or nylon sealing array 44 connected to the distal end of the outer tube 23 and a Teflon ring 46 connected to the distal end of the inner tube 21 arranged so that when the damping unit is fully retracted the Teflon ring 46 is located within the bearing 42. A scraper ring 48 is also provided intermediate the inner and outer tubes and the whole assembly is held together by a nut or other suitable fastener preventing the inner tube 21 and outer tube 23 from disengaging during use. Inlet 50 is provided in the wall of inner tube 21 for connection to conduit 18 to permit transfer of fluid between accumulator 10 and damping unit 20.

A shock absorbing assembly is provided to further limit the amount of travel of wheel 6 in the event that it is required or the suspension system just described is insufficient to limit the wheel movement. This additional assembly includes a strut arrangement comprising struts 70, 72 forming a generally triangular framework fixedly connected to chassis member 24. A shock absorber 74, having a downwardly depending ram 76 is fixedly located at the distal end of struts 70, 72. Ram 76 is forced to retract into the body of shock absorber 74 by contact with strut 30a as wheel 6 rises substantially vertically during use of vehicle 2. It is to be noted that this assembly is only activated and/or needed in exceptional circumstances when the main suspension system either reaches the limit of its capability or experiences a fluid leak or similar circumstance.

Figure 3:
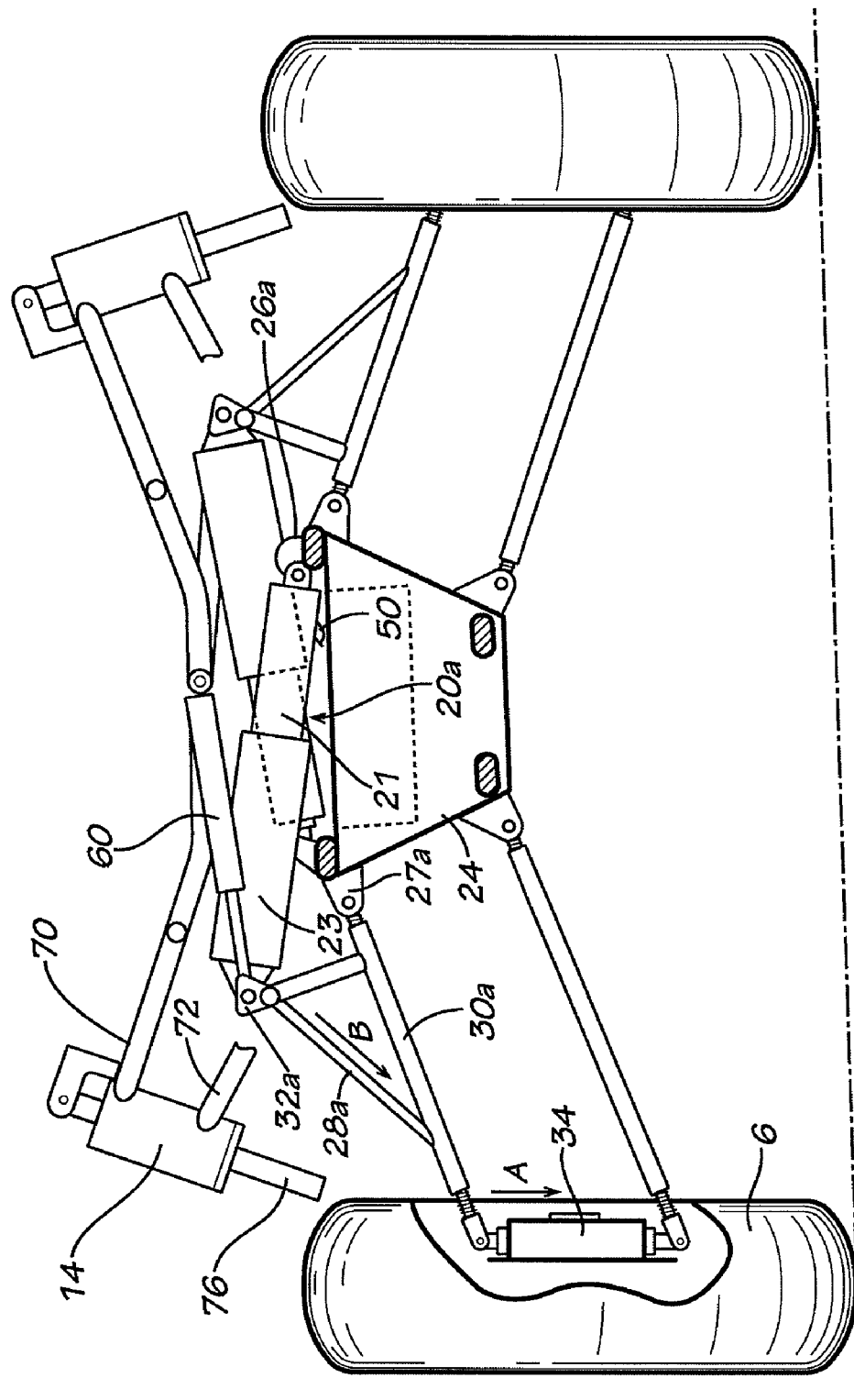
FIG. 3 is a front elevation view of the suspension system taken along the line 3 to 3 of FIG. 2 in a first condition which is the normal use position.

Operation of the suspension system of the present invention will now be described. In operation as vehicle 2 is being driven along a smooth stretch of road or similar, the suspension adopts a normal at rest position as shown in FIG. 3 in which inner member 21 and outer member 23 of the damping unit 20 are in their normal at rest positions such that the join between the two tubes is located about mid-way of the length of the unit.

Figure 4:
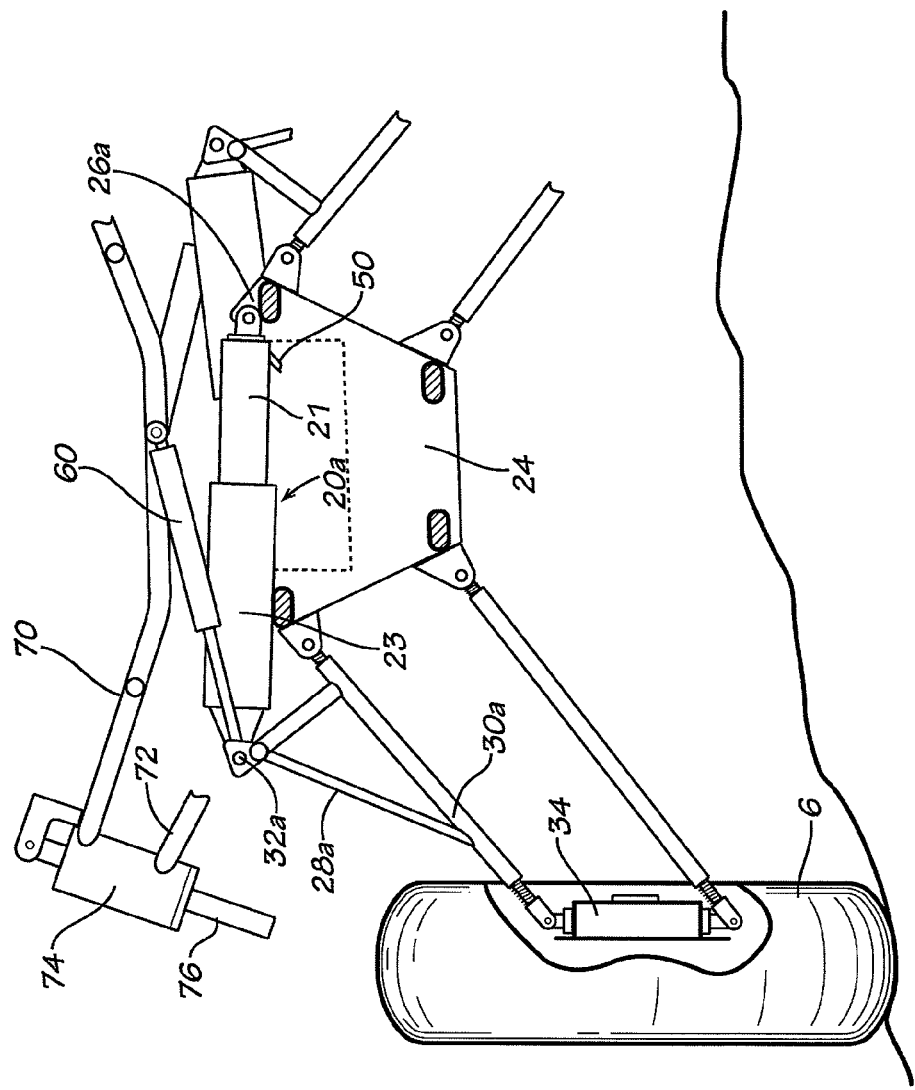
FIG. 4 is a front elevation view of the suspension system of FIG. 2 in a second condition which is a relatively raised position.
Figure 8:
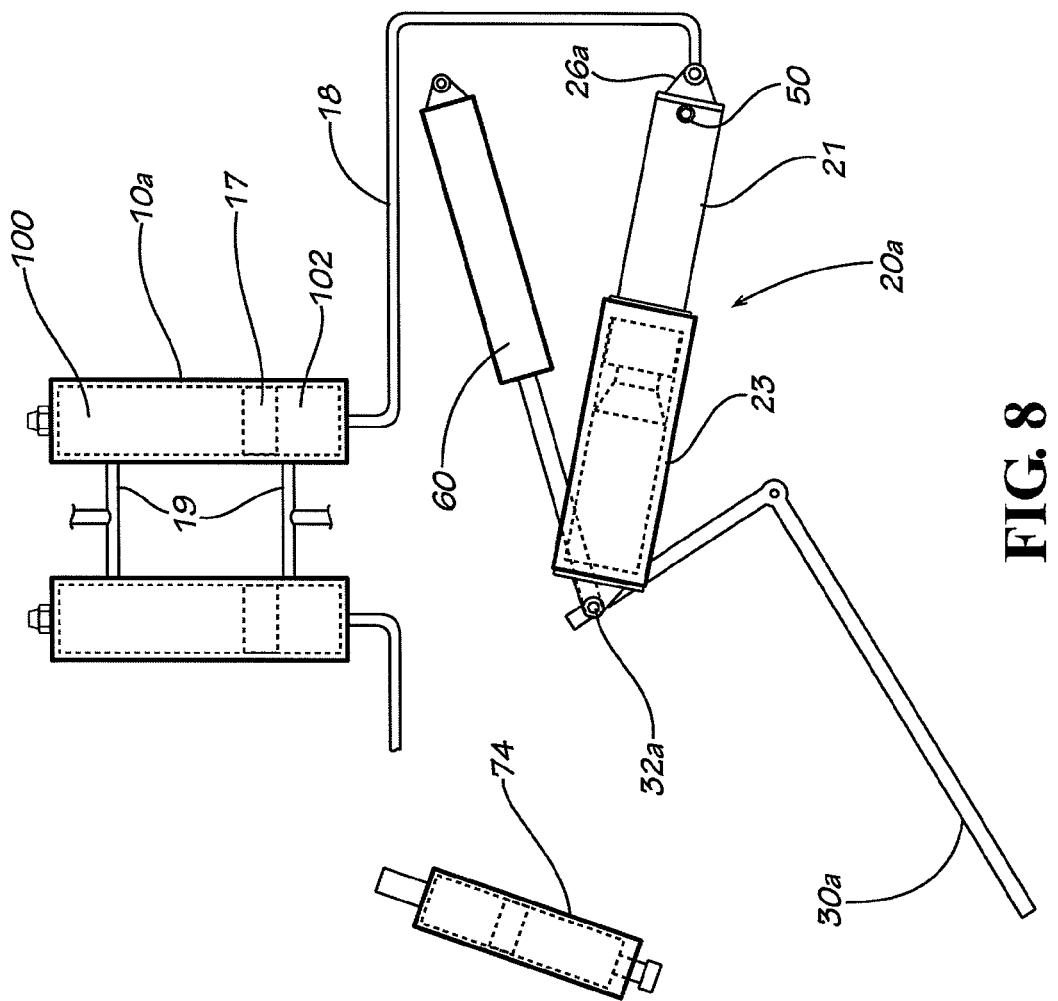
FIG. 8 is a schematic view of one form of the fluid connection between the accumulator and the damping unit in one condition corresponding to the extended position of the shock absorber when the road wheel is in the position shown in FIG. 4.

When road wheel 6 strikes a bump such as a trough, hollow, dip or the like, road wheel 6 is located relatively more lowered than chassis member 24 as shown in FIG. 4. In this position the end of upper wishbone 30a connected to hub 34 is deflected downwards as indicated by arrow A of FIG. 3 to adopt the position shown in FIG. 4 which in turn rotates strut arrangement 28a in a downwards direction as indicated by arrow B of FIG. 3 to adopt the position as shown in FIG. 4 which has the effect of extending the outer tube 23 with respect to inner tube 21 which is retained in position by pivoting fitting 26a connecting it to chassis member 24 so as to extend the length of damping unit 20a. As the outer tube 23 extends to increase the volume of damping unit 20a the pressure within damping unit 20a is reduced allowing more fluid to flow into damping unit 20a from cavity 102 of accumulator 10a via conduit 18 and inlet 50 by the movement of piston 17 axially within the accumulator 10 due to the fluid in accumulator 20a being under pressure from the gas in the cavity 100 which has the effect of decreasing the gas pressure in cavity 100 of accumulator 10a. The transfer of fluid associated with the lowering of road wheel 6 is shown diagrammatically in FIG. 8 showing piston 17 located more towards conduit 18 thereby, reducing the volume of cavity 102 and increasing the volume of cavity 100.

Figure 5:
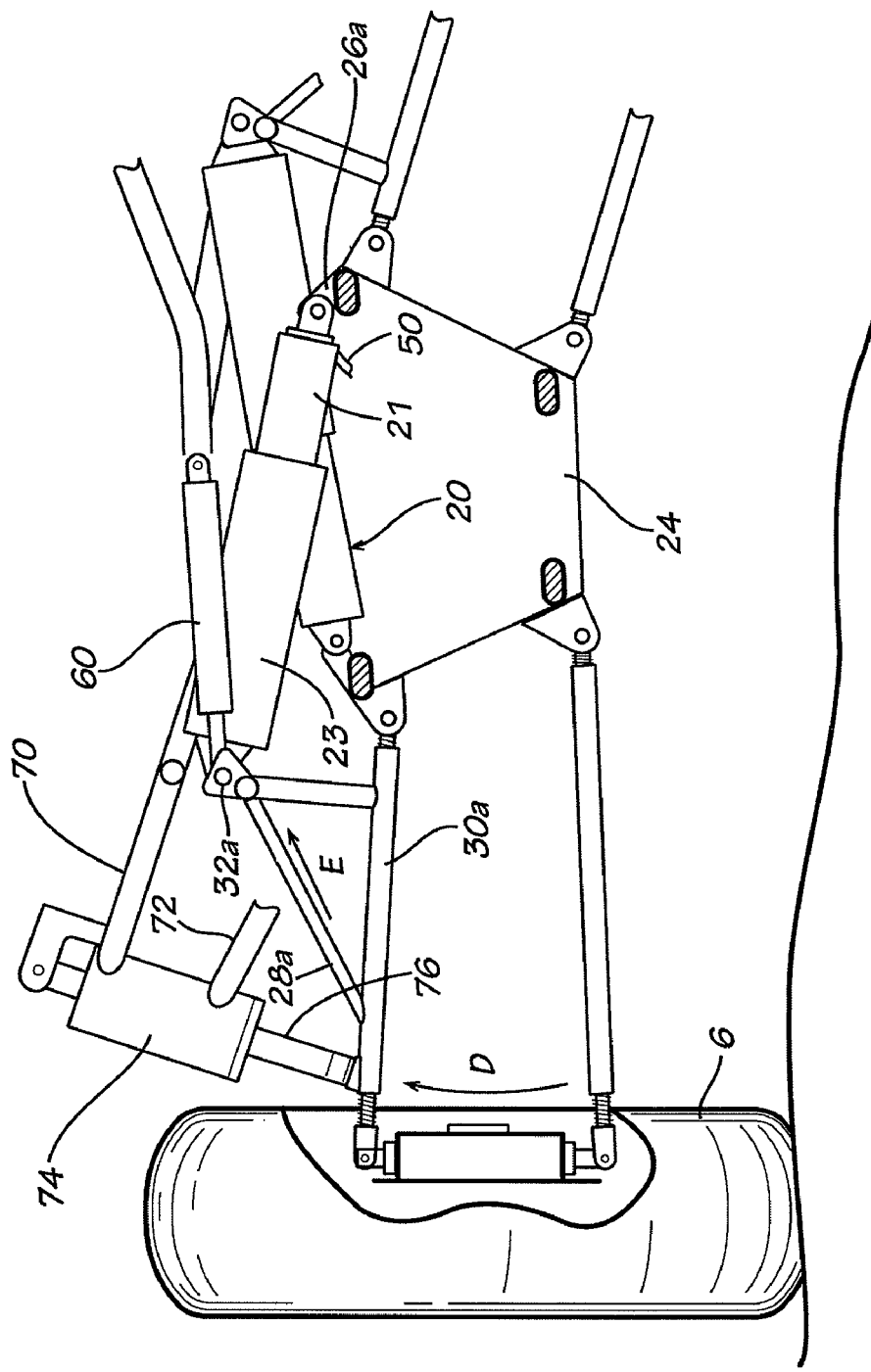
FIG. 5 is a front elevation view of the suspension of FIG. 2 in a third condition which is a relatively lower position.
Figure 9:
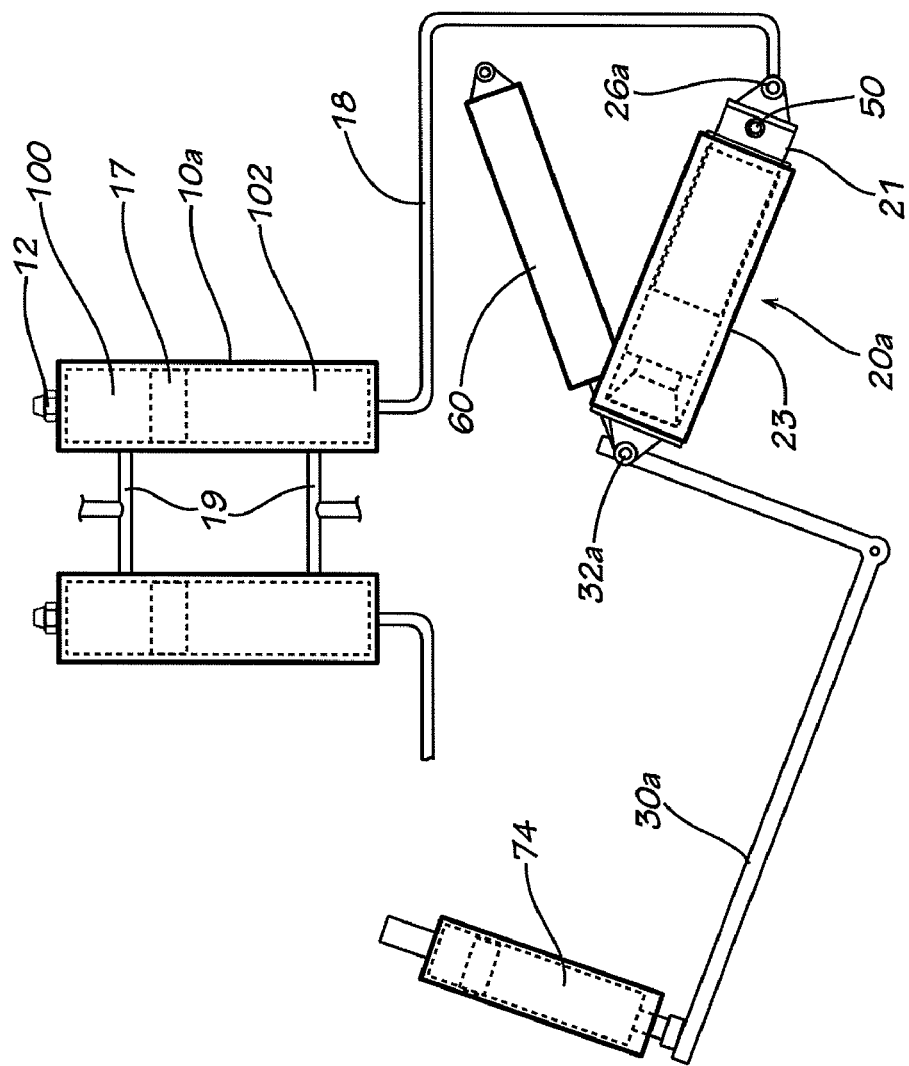
FIG. 9 is a schematic view similar to that of FIG. 8 showing the suspension system in another condition which corresponds to the retracted position of the damping unit when the road wheel is in the position shown in FIG. 5.

With particular reference to FIGS. 5 and 9, when vehicle 2 encounters a bump in the form of a rise, ridge, projection or the like, road wheel 6 is forced vertically upwards so that in one position wheel 6 is on about the same level as chassis member 24 as shown in FIG. 5. In this position the end of upper wishbone 30a connected to hub 34 is forced vertically upwards in the direction of arrow D of FIG. 5 which in turn raises strut arrangement 28a in the direction of arrow E of FIG. 5 which in turn forces the damping unit 20a to retract by forcing outer tube 23 towards inner tube 21 so that the volume of fluid in this unit is reduced as the distal ends of the inner 21 and outer 23 telescopic tubes are forced relatively closer to each other. This has the effect of forcing fluid from damping unit 20a via inlet 50 and conduit 18a to cavity 102 of accumulator 10a to axially move piston 17 towards valve 12 at the top of the accumulator thereby increasing the pressure on the gas contained in cavity 100 of the accumulator. The position of piston 17 is relatively closer to valve 12 as shown in FIG. 9 which has the effect of increasing the pressure of the gas in cavity 100. FIG. 9 also shows damping unit 20a in a retracted position. As the volume of cavity 100 of accumulator 20a is a relatively small volume the pressure of the gas in this volume is at a maximum so that it forces road wheel 6 to return to the normal at rest position or when road wheel 6 encounters a dip in the road or ground surface piston 17 is forced down due to the gas pressure to transfer fluid into damping unit 20a to extend it, typically to the normal at rest position or to the position shown in FIG. 4. By road wheel 6 continually and repeatedly moving vertically upwards and downwards in use of the vehicle in accordance with the terrain the vehicle is being driven over fluid is continually flowing into and out of damping unit 20a as it extends and retracts. The rate of flow between the accumulator 10a and damping unit 20a is regulated by the flooder valve provided in the unit itself or by the valving in external shock absorbers 60 and is transferred by the movement of piston 17 inside accumulator 20a which in turn is controlled by the amount of pressure applied by the compressed gas in cavity 100 at one end of the accumulator. As the fluid is continuously being forced into and out of the accumulator heat is generated and radiated through the inner walls 15 of the accumulator where it is removed by the coolant circulating the outer jacket 14 of the accumulator in order to maintain the operating temperature of the fluid.

Another embodiment of the suspension system of the present invention will now be described with particular reference to FIGS. 10 and 11. In this embodiment the accumulator and the damping means are contained within a single component in which the accumulator is formed from a first tubular member 112 telescopically located within a second tubular member 114 which includes the damping means, the two tubular members 112, 114 being connected together for relative movement and being in fluid communication with each other. The tubular member 112 of the accumulator is sealingly connected to the tubular member 114 of the damping means by an arrangement of seals and bearing members as will be hereinafter described with reference to FIG. 11.

Figure 10:
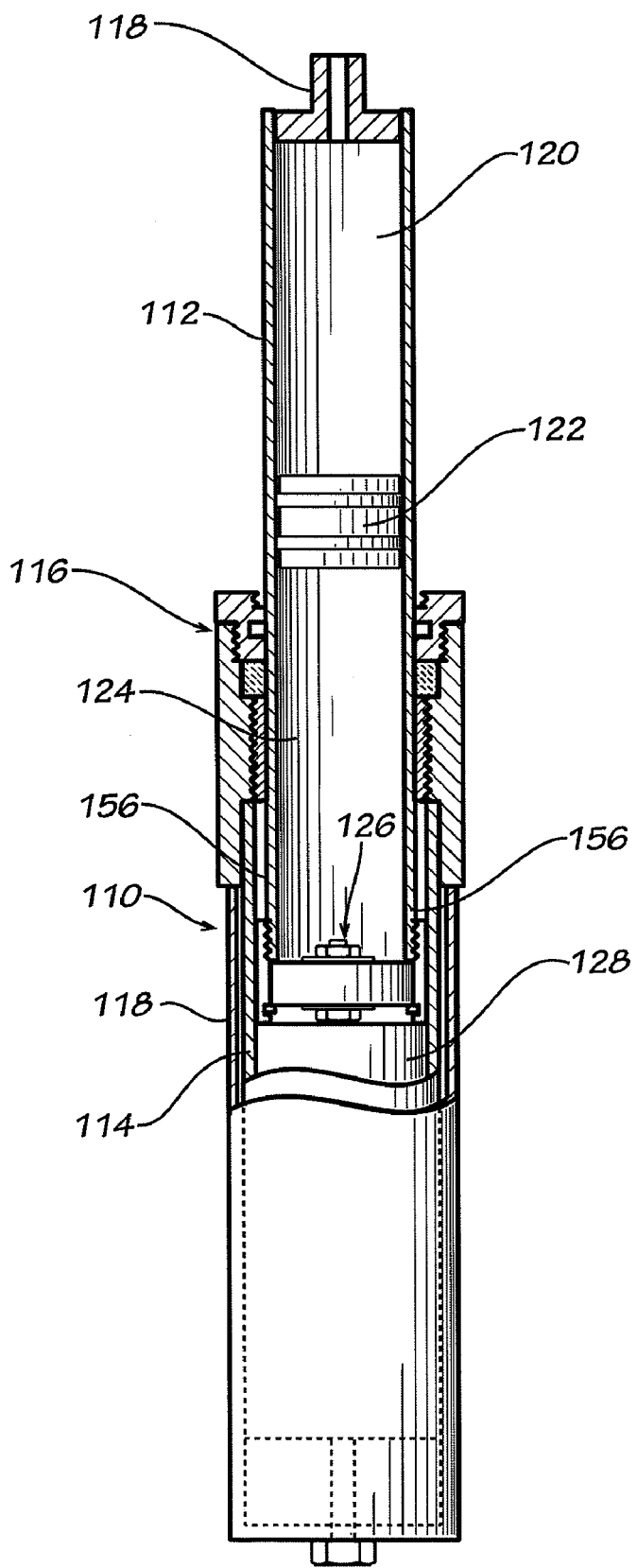
FIG. 10 is a cross-sectional view of another form of the suspension unit of the present invention being a combined damping unit and accumulator in a single unit.

The further embodiment of the suspension system of the present invention as shown in FIG. 10 is in the form of a component 110 which is a combination of the accumulator and damping means in fluid communication with each other similar to the arrangement previously illustrated and described but in a far more compact arrangement allowing greater flexibility for fitting to standard motor vehicles, motorcycles, trucks, cab suspensions, seat suspensions or the like, typically as a replacement for or in addition to the conventional suspension systems of privately owned motor vehicles such as for example McPherson struts, leaf springs, air operated bellows, or the like.

One end of tube 112 which is the outboard end or proximal end is provided with a filling valve 118 for introducing gas, such as nitrogen or similar, under pressure into accumulator tube 112 to fill a first chamber 120 located at or towards the proximal end of tube 112 for storing gas under pressure. A double sided floating piston 122 is provided intermediate the two ends of accumulator tube 112. The first chamber 120 is formed between filling valve 118 and piston 122. A second chamber 124 is formed between piston 122 and the inboard end or distal end of tube 112. Hydraulic fluid fills the second chamber 124 of accumulator 112. A double acting valve arrangement 126 is provided at or towards the inboard end or distal end of accumulator tube 112 and moves through the hydraulic fluid or the hydraulic fluid moves through it in accordance with corresponding relative movement of tubes 112 and 114, depending on whether the valve arrangement is fixed or free to move. Preferably, the valve arrangement is fixed as shown in the drawings.

The individual valving of valve 126 is such to allow fluid to flow in one direction at one rate when tube 112 moves in a first direction relative to tube 114, and to flow in the opposite direction at a second rate when tube 112 moves in the opposite direction. The rate of movement of fluid through the valve 126 is dependent upon the number, size and arrangement of the apertures, ports or passageways 125a and flow restrictors, or shims 126a forming the individual valving within valve 126. It is to be noted that the construction and operation of valve 126 is similar to that of the flooder valve previously described with reference to FIG. 6. Further, it is to be noted that the construction of the combined unit, particularly with the valve arrangement 126 being fixed to the distal end of the tube 112 allows the suspension system to be used to control and/or maintain the ride height of the vehicle in addition to providing suspension or damping characteristics.

Damping tube 114 extends from connector arrangement 116 which is located at the inboard or distal end of this tube to the other end of the combined component 110 which is the outboard or proximal end of tube 114. Damping tube 114 is filled with hydraulic fluid. As valve 126 separates chamber 124 and the interior of tube 114 defining a third chamber 128, both tubes 112 and 114 are in fluid communication with each other through valve 126.

The tubes 112 and 114 are radially spaced to define an annular side chamber 152 that increases and decreases in length on relative movement of the tubes 112 and 114. The side chamber 152 is in fluid communication with the chamber 124 through one or more bleed holes or ports 156. The bleed holes or ports 156, two or more of which may be circumferentially spaced as shown in FIGS. 10 and 11 and/or axially spaced as shown in FIG. 12A, provide a further controlled fluid flow restriction to movement of fluid between the chamber 128 and the side chamber 152 to further assist control of relative movement of the tubes 112 and 114.

Both ends of combined component 110 are provided with suitable fittings to enable this component to be located in place as part of the suspension system of a motor vehicle. It is to be noted that any suitable fitting can be provided at either or both ends of this form of the component. If necessary or desirable, tubes 112, 114 can be provided with outer cooling jackets defined by cylindrical wall 148 for receiving recycled coolant to cool component 110 in use. Additionally or alternatively, the outer surface of damping tube 114 is provided with removable, replaceable and/or interchangeable air cooling fins locatable around the outside of the outer wall of tube 114 for increased cooling if required.

Figure 11:
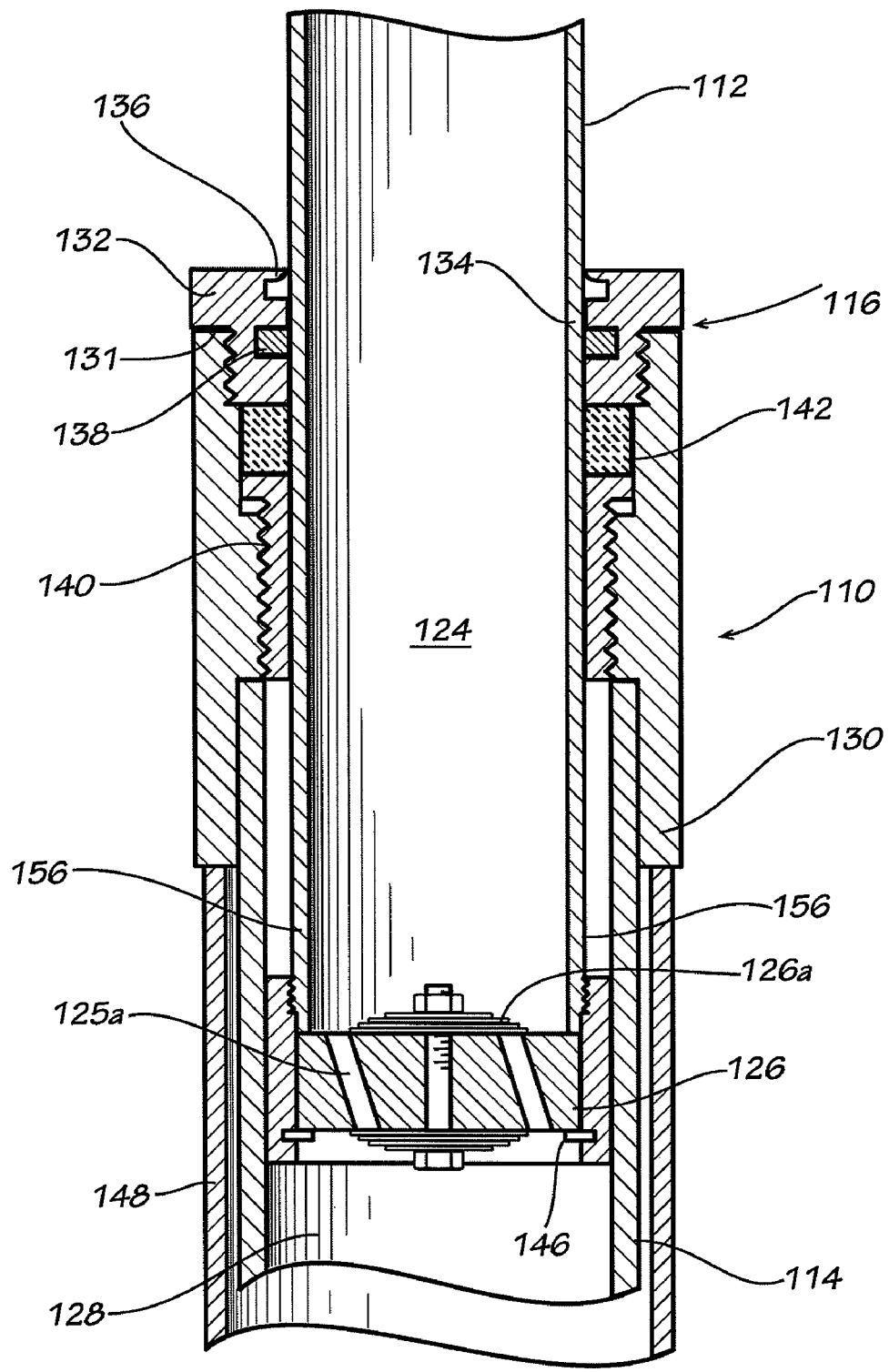
FIG. 11 is a partial cross-section view of the suspension unit shown in FIG. 10 showing the connection between the two parts in more detail.

With particular reference to FIG. 11 in which the construction of connector 116 is shown in more detail, the arrangement of this connector will now be described. The inboard end of accumulator. tube 112 is shown received within the inboard end of damping tube 114. A headpiece 130 is fixedly connected to the inboard end of damping tube 114 and extends from the inboard end of damping tube 114 towards accumulator tube 112. Headpiece 130 is screw threadingly engaged to a corresponding screw thread located at the inboard end of damping tube 114. The distal end of headpiece 130 is also provided with an internal threaded portion for receiving a fastening nut 132 therein. Nut 132 is sealed to headpiece 130 by 0-ring 131. Fastening nut 132 is provided with a centrally located aperture 134 through which is received the inboard end of accumulator tube 112. A scraper seal 136 and an 0-ring 138 are provided in appropriate grooves located in the internal wall of the aperture of fastening nut 132 to seal movement of tube 112 through connector 116. A bush 140 is located internally within headpiece 130 to act as a guide for the movement of accumulator tube 112 and to further seal the component 110 against leaking. A seal 142 is provided between bush 140 and nut 132. The valve arrangement 126 is located at the distal end or inboard end of accumulator tube 112. Valve 126 is held in place within the distal end of tube 112 by circlip 146. An outer jacket wall 148 is provided around the outside of tube 114 to define, with the tube 114, a space for receiving recycled coolant therethrough to assist in cooling the component during operation.

In operation of this form of the suspension system the outboard end of damping tube 114 is fixedly located to the wheel of a motor vehicle or to another component which is connected either directly or indirectly to one road wheel of the vehicle. Thus, tube 114 moves in accordance with substantially vertical movement of the wheel over bumpy or rough terrain or the like. The outboard end of accumulator tube 112 is connected to the body work of the motor vehicle or other fixed component and is thus relatively fixed in place.

As valve 126 is fixedly connected to the inboard end of tube 112 in one embodiment, valve 126 remains relatively stationary and hydraulic fluid flows through the valve during operation of the suspension system producing relative movement of the tube 114.

In operation, when a road wheel encounters a bump in the form of a crest or rise or similar, damping tube 114 is forced towards accumulator tube 112 so that the length of the combined component 110 is reduced. In turn, the inboard end of tube 112 is forced further into the body of tube 114 thereby pumping hydraulic fluid from within tube 114 through the ports or passageways 125a in valve 126 into chamber 124 provided between the inboard surface of piston 122 and valve 126. As the volume of fluid being forced into chamber 124 increases, piston 122 travels axially within the tube 112 towards the outboard or proximal end of this tube thereby further compressing the gas in chamber 120 and increasing the internal gas and fluid pressures within tubes 112 and 114. This in turn offers increasing resistance to further movement of tube 114 thus limiting the amount of travel of tube 114 which in turn limits the amount of travel of the road wheel in a substantially vertically upwards direction.

When the road wheel returns to its normal position, such as for example, when rebounding or when encountering a trough or crest in the road the length of combined unit 110 is increased by tubes 112 and 114 telescopically expanding with respect to each other thereby allowing fluid to move from chamber 124 into chamber 128 which reduces the amount of fluid in chamber 124 allowing piston 122 to move under the increased gas pressure of the compressed gas stored in chamber 120 which in turn reduces the compression or gas pressure of the gas in chamber 120. Further fluid is pumped into tube 114 until all of the pressures equilibrate. The rate at which fluid can flow through valve 126 limits the rate of travel of the road wheel in the substantially vertically downward direction.

In a still further embodiment of the suspension system of the present invention modification to the combined component includes the addition of a removable/replaceable/interchangeable canister or other container (not shown) associated with accumulator tube 112. In this embodiment an interchangeable container in the form of a canister or similar, such as for example, a container similar to a spin-on/spin-off oil filter is provided at or towards the proximal end of tube 112 at the side of accumulator tube 112 by means of a suitable extension T piece, take-off or similar outlet located at or towards the outboard end of accumulator 112. The internal volume of the canister provides a reservoir for the gas located in chamber 120 of accumulator tube 112 in order to increase the volume of gas available for operation of this form of the suspension component, and thus the rate of movement of the suspension unit.

A still further modification includes the provision of a secondary canister being in fluid communication with a secondary oil reservoir provided with a movable piston for either independently pumping fluid into the canister at a pre-determined or selected rate or for pumping fluid in accordance with movement of the suspension system during operation of the vehicle.

A still further modification of the present invention relates to an active suspension system, preferably a computer controlled active suspension system of the type having a sensor for detecting the type and amount of movement of the vehicle. In this embodiment, a first reservoir, canister or container contains gas under pressure and is in fluid communication with the gas space or chamber of the suspension unit. The gas is maintained under pressure by a moveable piston. A second canister or container which is filled with oil is in fluid communication with the first canister. A piston provided in the second canister is connected to a sensor, typically a computer controlled motion sensor of the type used in active suspensions, and moves in accordance with the motion detected by the sensor to pump oil from the second canister into the first canister to increase the gas pressure and thus alter the ride height of the vehicle by altering the amount of extension of the suspension unit. With this embodiment, in the event of failure of the sensor as ancillary components the piston in the first canister is forced back to seal the first canister from the second canister to prevent gas escaping from the first canister thereby ensuring that the suspension unit can still work to maintain the ride height of the vehicle and thereby acting as a fail safe or back-up system allowing the vehicle to continue to operate.

A still further modification of the present invention includes providing by pass conduits or similar at spaced apart intervals over the length of the combined conduit. The bypass conduits which are located external to the body of the unit provide a means of fine tuning the compression and rebound characteristics of the unit. Typically, one, two, three or more by-pass tubes are provided in which a two tube arrangement allows for one adjustment on compression and one on rebound while a three tube arrangement allows for two zone adjustment on compression and one on rebound.

Figure 12:
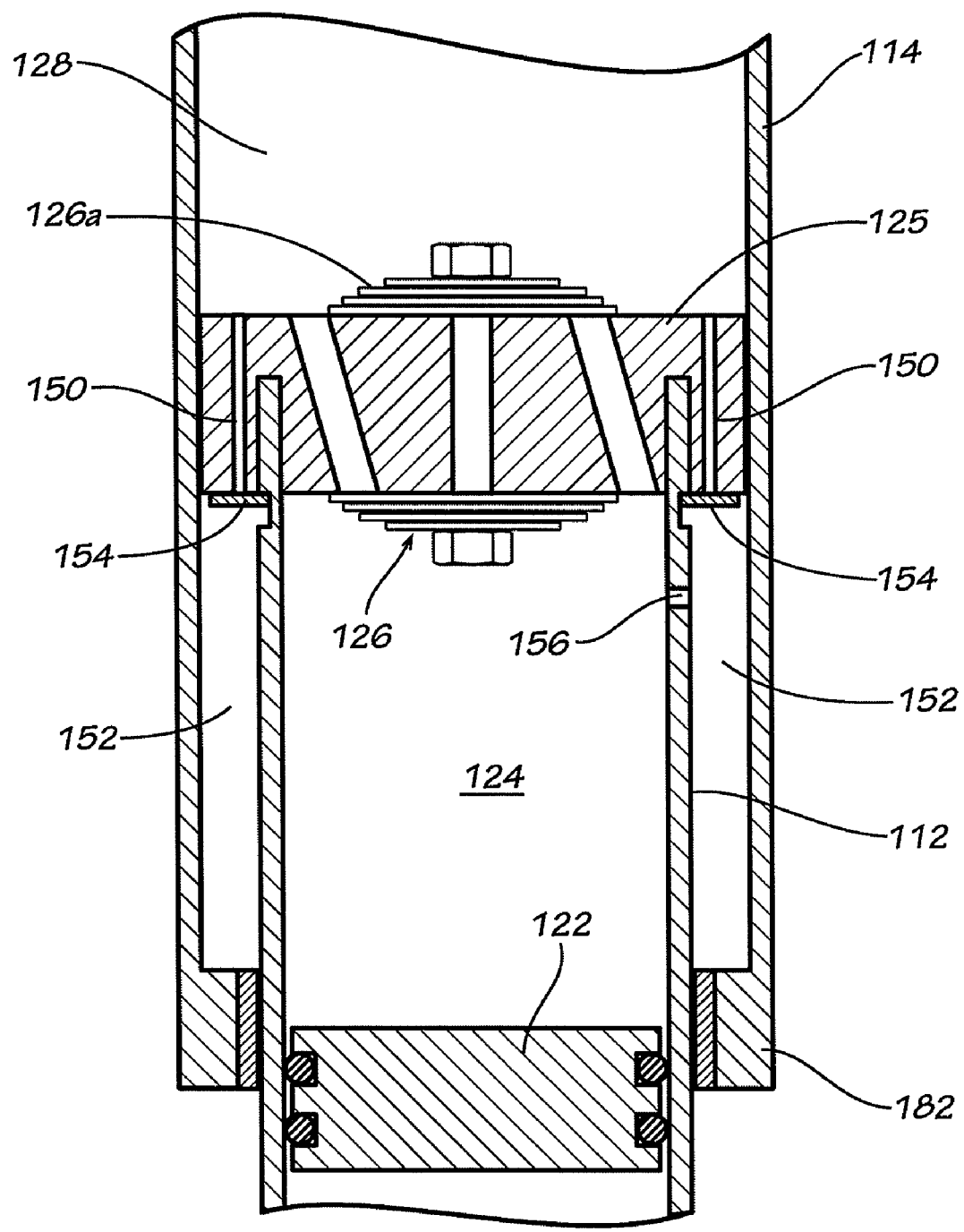
FIG. 12 is a fragmentary cross-sectional view depicting a modification of the suspension unit of FIG. 10 for enhanced rebound damping in trucks or other vehicles having high axle loads.
Figure 12A:
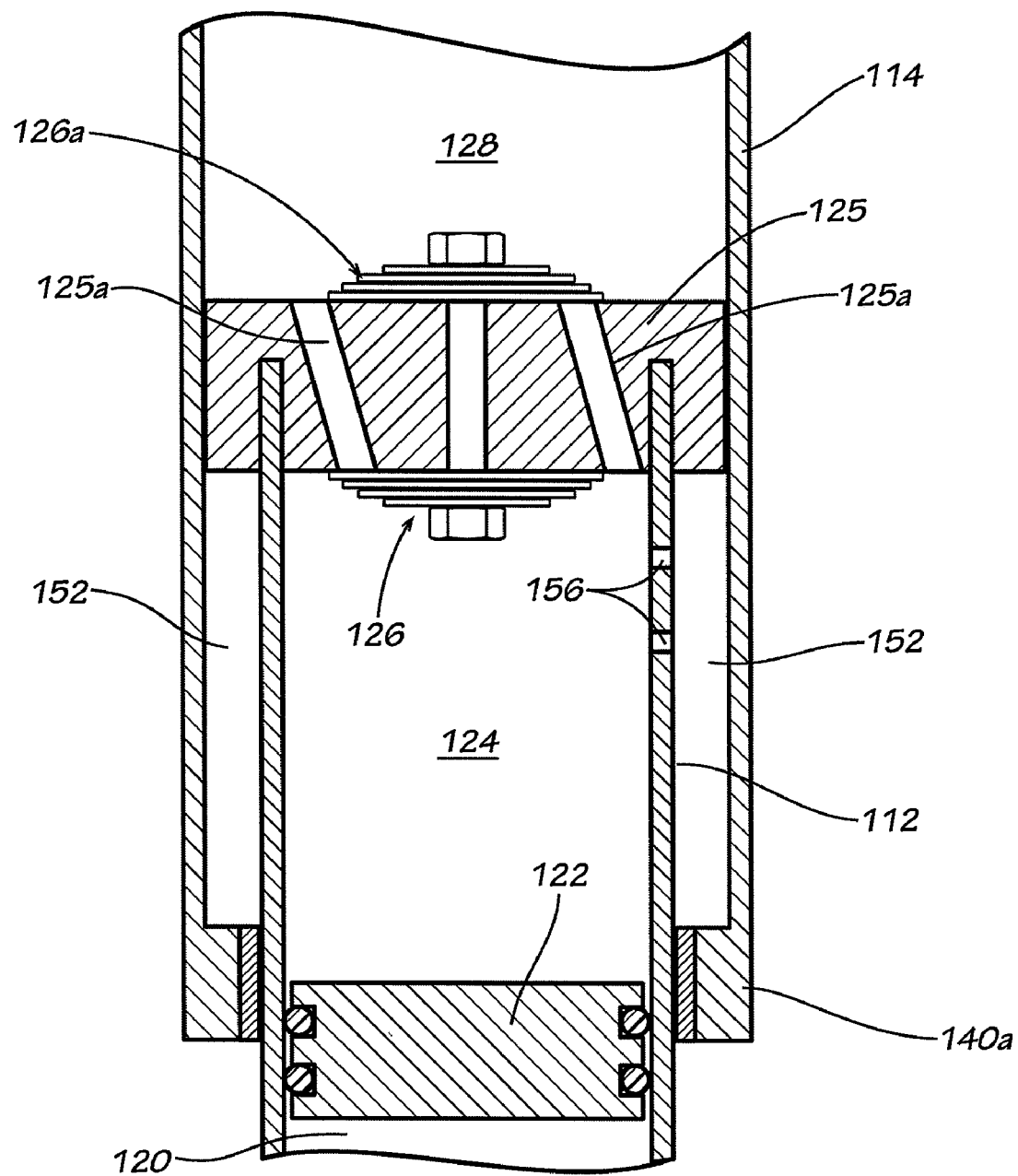
FIG. 12A is a further fragmentary cross-sectional view depicting another modification of the suspension unit of FIG. 10

In general, but especially in the case of trucks and other vehicles having high axle loads, additional controlled rebound damping, relative to compression of the suspension unit, may be achieved by means of the single unit modification illustrated in FIG. 12. During compression, fluid is forced through a ring of elongate ducts 150 that form ports adjacent the periphery of valve body 125 for valve 126, which is itself of similar construction to the valves of earlier described embodiments. Ports 150 open into the sealed annular chamber 152 about tube 112 behind piston body 125. On rebound, an annular non-return valve shim or individual shims 154 close ports 150, and the fluid in chamber 152 is bled through a single port 156 in tube 112, close to the valve body into chamber 124. When end cap 182 passes port 156, the residual fluid in chamber 152 cushions the further relative motion of tubes 112, 114, and thereby provides hydraulic top-out.

The size of port 156 is pre-set to give the desired level of rebound damping control. A single port 156 is preferred but two or more smaller ports may be provided. The configuration of FIG. 12 may be used in place of or in conjunction with the aforedescribed by-pass tuning conduits.

Referring to FIG. 12A, this illustrates a further modification of the structure of FIG. 10 but in which the valve body 125 is in the form of a piston fixed to the distal end of the tube 112 and having an outer surface that moves along the inner wall surface of the tube 114 and forms one end of the side chamber 152. At least two axially spaced bleed ports 156 enable fluid to pass between the chamber 124 and the side chamber 152. As the valve body 125 approaches the end cap 140a, first one bleed port is closed, thus increasing the resistance to fluid movement from the side chamber 152, and then the second port is closed providing a hydraulic top-out to the relative movement.

It is to be noted that the components of the present invention in addition to being used as suspension components can also be used to adjust the ride height of the vehicle by altering the size of the various components, the amount of hydraulic fluid used in the system, the volume of the reservoir or reservoirs of gas, the gas pressure, and the size of the interchangeable canister and associated secondary oil reservoir. Thus, the components of the present invention are not only useful as suspension components but are also useful as components for altering the ride height of a motor vehicle, or controlling and/or maintaining the ride height of the vehicle, and/or adjusting the ride height of a vehicle. The system also provides a self-leveling suspension system or a system for maintaining the ride height of a vehicle at a predetermined height.

Figure 13:
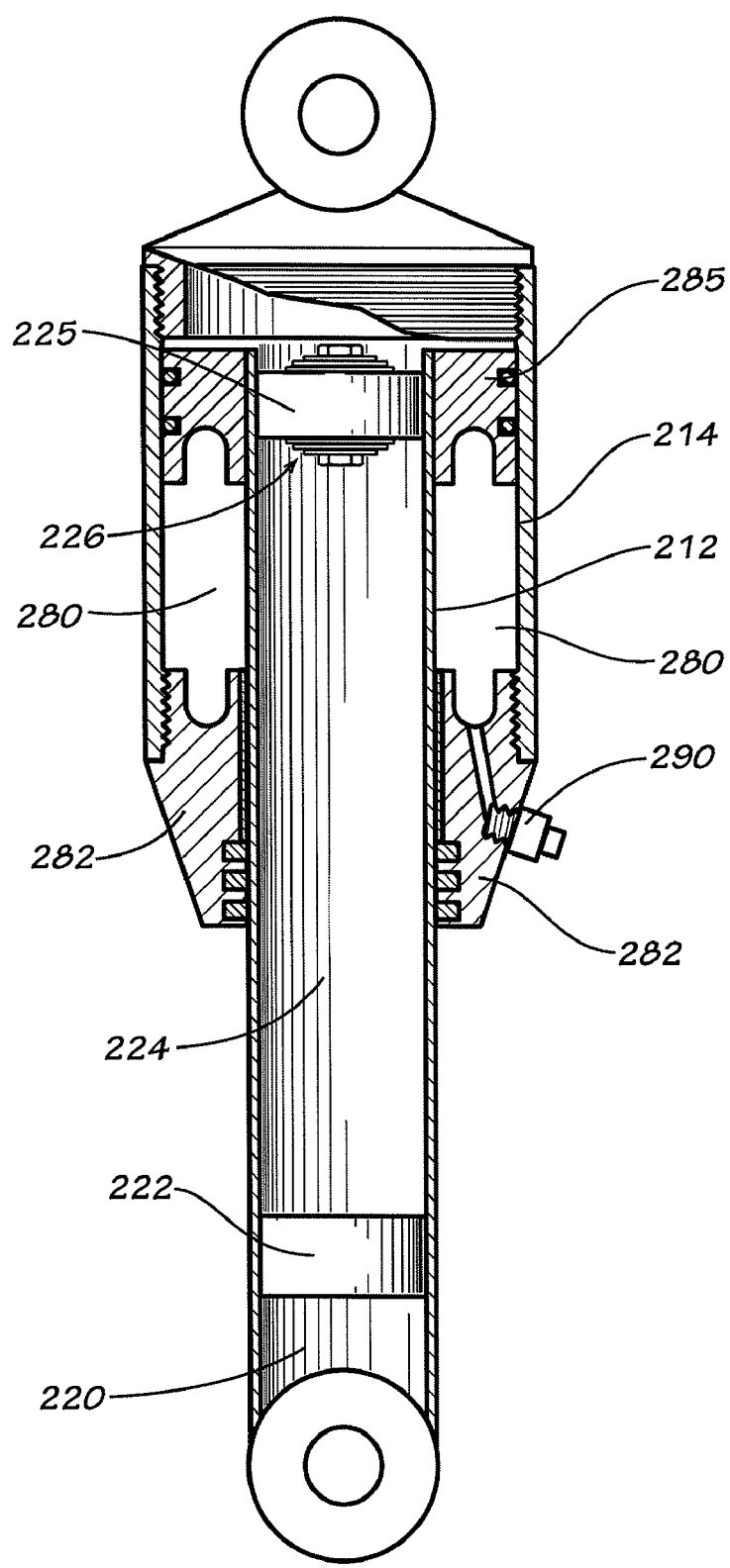
FIG. 13 is a cross-sectional view of a still further form of a suspension unit according to the present invention, being also a single unit especially suitable for certain motorcycles, and having provision for adjusting ride height.

FIG. 13 depicts a suspension unit with ride-height adjustability that is especially suitable for certain constructions of motorcycle, eg. a Harley Davidson "soft-tail". This unit has the same principal features as the unit of FIGS. 10 and 11, including tubes 212, 214, floating piston 222, valve body 225, with valve 226, and chambers 220, 224. The unit is mounted with its axis generally horizontal: in the "soft-tail" configuration, an increase of the length of the unit reduces ride height and vice-versa.

Within tube 214 and surrounding tube 212 is an annular gas chamber 280 defined between an externally tapered end cap 282 threadably fastened into the end of tube 214, and an annular sleeve 285 that is secured about the end of tube 212.

A gas or air valve 290 in end cap 282 permits chamber 280 to be selectively pressurized or evacuated, respectively to move end cap 282 and sleeve 285 apart or to draw them towards each other. Drawing end cap 282 and sleeve 285 together causes tubes 212, 214 to relatively extend so as to decrease the ride eight, and conversely for increased pressure in chamber 280.

This change in the rest ride height does not change the general operation of the suspension arrangement, it simply adjusts the at rest separation of the parts and the relative movement of the parts when the motorcycle is being ridden is as it was previously but about a different position. However, when the motorcycle is carrying the increased load, the actual rest position will effectively be the same as that of the motorcycle with a single rider.

The use of the suspension unit of FIG. 13 in a motorcycle not only adds to the comfort of the rider and the passenger (many motorcycles tend to regularly bottom their suspension when carrying a passenger) but also adds to the safety of the rider and the passenger as the handling characteristics of the motorcycle are not reduced by the suspension operating in an incorrect configuration.

Advantages of the present invention include the following. The spring rating characteristics of the system can be easily adjusted by changing the gas-to-fluid volume ratio, eg. by changing gas pressure in the first cavity of the accumulator and/or by fitting different sized canisters.

There are no metal springs or spring components to break or distort. A flexible and supple ride is provided even though the vehicle is being driven over very rough terrain at very fast speeds.

A compact yet effective suspension system is possible using the present invention.

The ride height of the vehicle can be maintained/controlled by the suspension unit since it is self supporting and provides resistance which cannot be overcome by the weight of the vehicle and its contents, as well as providing a self leveling ride.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A suspension unit including:
an accumulator for holding and maintaining a fluid under pressure, and a motion damping means, said accumulator having a floating piston that sealingly separates a first chamber for storing a pressurized gas and a second chamber for storing said fluid under pressure;

said motion damping means including a third chamber, that is fluid-filled in operation, in fluid flow communication with said second chamber of said accumulator, said motion damping means having valve means separating said second chamber from said third chamber for permitting a controlled flow of said fluid between said second and third chambers via shimmed valve ports;

wherein said accumulator and said motion damping means are capable of relative retracting and extending movement during which fluid is forced through said valve means at respective predetermined controlled rates so as to dampen the relative movement during retraction or extension;

said relative movement when said accumulator and said motion damping means relatively extend, cause fluid to flow from said second chamber of the accumulator through the valve means to said third chamber of said motion damping means, whereby gas pressure in said first chamber moves said floating piston in said accumulator thereby reducing the gas pressure in said first chamber, and when said accumulator and said motion damping means relatively retract, fluid is caused to flow from said third chamber of said motion damping means through the valve means to said second chamber of said accumulator, thereby increasing the fluid pressure therein and moving said floating piston to increase the pressure of the gas in said first chamber;

wherein said suspension system further includes:

a side chamber within said motion damping means about said accumulator, wherein said side chamber respectively expands and contracts with said relative retracting and extending movement of said accumulator and said motion damping means; and at least one bleed port communicating said side chamber with said second chamber, the bleed port restricting the flow of fluid between the side chamber and the second chamber thereby assisting control of the relative movement of the accumulator and said motion damping means wherein said valve means is a flooder valve allowing fluid to flow through said valve in two different directions, the valve means having peripheral ducts in fluid one way communication during retraction only with said third chamber and said side chamber, of a different size to said valve ports in fluid communication with said third chamber and said second chamber such that the rate of flow of fluid through said valve means from the second chamber to the third chamber under predetermined extending forces differs from the rate of flow of fluid through said valve means from the third chamber to the second chamber under similar retracting forces, wherein said side chamber has a non return valve arrangement whereby fluid passes directly from said third chamber to said side chamber during retraction and via said second chamber and associated bleed port during extension.

2. A suspension system according to claim 1 wherein said valve means is provided in a valve body fixed at an inner end of said accumulator.

3. A suspension system according to claim 1 further including by-pass conduits located externally of said the valve means to provide variable valving.

4. A suspension system according to claim 1 wherein said side chamber is an annular chamber between said accumulator and said motion damping means.

5. A suspension system according to claim 1 wherein said valve means is provided in a valve body fixed at an inner end of said accumulator, and a non-return valve arrangement comprises duct means in said valve body for transferring fluid from said third chamber to said side chamber during said relative retracting movement of said accumulator and said motion damping means, and said non-return valve arrangement further includes one or more non-return valve elements for preventing fluid flow through said duct means during said relative extending movement of said accumulator and said motion damping means.

6. A suspension system according to claim 5 wherein said one or more non-return valve elements comprises an annular shim.

7. A suspension system according to claim 1 wherein said valve means includes inclined passages and associated shims controlling fluid flow at ends of the inclined passages.

8. A suspension system according to claim 1 wherein said first chamber comprises a gas-chargeable chamber of selectively variable pressure, the at rest relative positions of said accumulator and motion damping means under predetermined load conditions being adjusted by adjusting said gas pressure.

9. A suspension system according to claim 1 wherein two or more bleed ports are spaced circumferentially around said second chamber and communicate said side chamber with said second chamber.

10. A suspension system according to claim 1 wherein said floating piston includes a pair of axially spaced sealing rings for engagement with an internal wall of said accumulator.

11. A suspension system including:

a combination of an accumulator for holding and maintaining a fluid under a particular pressure, and a motion damping means, said accumulator having a floating piston that sealingly separates a first cavity for storing pressurized gas and a second cavity for storing said fluid under pressure; said motion damping means including a third cavity, that is fluid-filled in operation, in fluid flow communication with said second cavity of said accumulator, said motion damping means having valve means separating said second cavity from said third cavity for permitting flow of said fluid between said second and third cavities;

wherein said accumulator and said motion damping means are capable of relative retracting and extending movement during which fluid is forced through said valve means at respective predetermined controlled rates so as to dampen the movement; said movement when said accumulator and said motion damping-means relatively extend, cause fluid to flow from said second cavity of the accumulator to said third cavity of said motion damping means, whereby gas pressure in said first cavity moves said floating piston in said accumulator to reduce the gas pressure throughout said first cavity, and when said accumulator and said motion damping means relatively retract, fluid is caused to flow from said third cavity of said motion damping means to said second cavity of said accumulator, whereby to move said floating piston to increase the gas pressure of the gas in said first cavity;

wherein said suspension system further includes;

a side chamber within said motion damping means about said accumulator, wherein said side chamber respectively expands and contracts with said relative retracting and extending movement of said accumulator and said motion damping means;
a non-return valve arrangement whereby fluid may pass directly from the third cavity to the side chamber; and
at least one bleed port communicating said side chamber with said second cavity for providing rebound damping control, wherein said valve means is a flooder valve allowing fluid to flow through said valve in two different directions, the valve means having peripheral ducts in one way fluid communication during retraction only with said third chamber, and said side chamber of a different size to said valve ports in fluid communication with said third chamber and said second chamber such that the rate of flow of fluid through said valve means from the second chamber to the third chamber under predetermined extending forces differs from the rate of flow of fluid through said valve means from the third chamber to the second chamber under similar retracting forces wherein said side chamber has a non return valve arrangement whereby fluid passes directly from said third chamber to said side chamber during compression and via said second chamber and associated bleed port during rebound.

12. A suspension system according to claim 11 wherein said valve means is provided in a valve body fixed at an inner end of said accumulator, said valve body having duct means for transferring fluid from said motion damping means to said side chamber during said relative retracting movement of said accumulator and said motion damping means, and said non-return valve arrangement includes one or more non-return valve elements for preventing fluid flow through said duct means during said relative extending movement of said accumulator and said motion damping means.

13. A suspension system according to claim 12 wherein said one or more non-return valve elements comprises an annular shim.

14. A suspension system according to claim 11 wherein said valve means is provided in a valve body fixed at an inner end of said accumulator, said valve body having duct means for transferring fluid from said third cavity to said side chamber during said relative retracting movement of said accumulator and said motion damping means, and said non-return valve arrangement includes one or more non-return valve elements for preventing fluid flow through said duct means during said relative extending movement of said accumulator and said motion damping means.

15. A suspension unit comprising:
an accumulator for holding and maintaining a fluid under pressure, including a first chamber for storing a pressurized gas, a second chamber for storing said fluid under pressure and a floating piston that sealingly separates said first and second chambers;
a motion damping means mounted to said accumulator for relative retracting and extending movement therewith, said motion damping means including a third chamber, that is fluid-filled in operation,
a side chamber defined intermediate said motion damping means and said accumulator, wherein said side chamber respectively expands and contracts with said relative retracting and extending movement of said accumulator and said motion damping means; at least one bleed port communicating said side chamber with said second chamber, the bleed port restricting the flow of fluid between the side chamber and the second chamber thereby assisting control of the relative movement of the accumulator and said motion damping means; and
a valve unit separating said second chamber from said third chamber for permitting a controlled flow of said fluid between said second and third chambers via shimmed valve ports defining a flooder valve allowing fluid to flow through said valve unit in two different directions, during which fluid is forced through said valve unit at respective predetermined controlled rates so as to dampen the relative movement during retraction or extension, said valve ports in fluid communication with said third chamber and said second chamber being of a different size such that the rate of flow of fluid through said valve unit from the second chamber to the third chamber under predetermined extending forces differs from the rate of flow of fluid through said valve means from the third chamber to the second chamber under similar retracting forces; said valve unit having peripheral ducts in fluid one way communication during retraction only with said third chamber and said side chamber and a non return shim associated with each of said peripheral ducts whereby fluid passes directly from said third chamber to said side chamber during retraction only and from said side chamber to said second chamber via said associated bleed port during extension, such that when said accumulator and said motion damping means relatively extend, fluid flows from said second chamber of the accumulator through the flooder valve to said third chamber of said motion damping means, whereby gas pressure in said first chamber moves said floating piston in said accumulator thereby reducing the gas pressure in said first chamber, and when said accumulator and said motion damping means relatively retract, fluid flows from said third chamber of said motion damping means through the flooder valve to said second chamber of said accumulator, thereby increasing the fluid pressure therein and moving said floating piston to increase the pressure of the gas in said first chamber.

\* \* \* \* \*